United States Patent Office 3,671,112
Patented June 20, 1972

3,671,112
REFERENCE TIME SCALE APPLICATION TO HIGH SPEED FILM AT HIGH PULSE REPETITION RATES
Andrew E. Lennert and Frank L. Crosswy, Tullahoma, and Henry T. Kalb, Manchester, Tenn., assignors to the United States of America as represented by the Secretary of the Air Force
Filed Mar. 18, 1971, Ser. No. 125,571
Int. Cl. G03b 41/00
U.S. Cl. 352—84
4 Claims

ABSTRACT OF THE DISCLOSURE

An apparatus for applying a reference time scale to high speed film utilizing a neon timing light source, a timing signal generator and a transmission line to connect the generator to the light source. Timing pulses having fast rise and fall times are produced at high pulse repetition rates to provide a reliable application of timing marks to the film.

BACKGROUND OF THE INVENTION

The present invention relates broadly to a film marking system and in particular to a high speed timing lamp system for applying a reference time scale to film.

It is well known that high speed motion picture cameras are extensively employed in research and development activities, and are particularly useful in dynamic testing for acquiring a permanent visual documentation of the test event. In order to suitably serve as an analytical tool in dynamic testing, the film speed may typically range from 100 to 10,000 pictures per second. To establish an event per unit time correlation, a common prior art technique is to time "mark" the film margin (during the test) with a precisely timed pulsed light source. The light source is generally housed within a timing light block integral with the camera. The light source is permitted to pulse expose the film margin over an area defined by the timing light block slit and/or optic coupling to film plane. The timing mark density is a function of the light source intensity at the film plane and pulse duration time. The timing mark definition, in order to provide sharp density gradient along the edges, requires rigid control of the light source current pulse amplitude-time product. An excessive intensity produces flair extending into the film frame, and an inadequate intensity produces illegible marks. A light source having poor current pulse rise and fall times, produces fuzzy-edged marks or marks with "tails." In addition, the prior art conventional timing lamp systems produce ill-defined light source current pulses or complete timing lamp "dropout" when operated in areas having long transmission lines, large value lamp current ballast resistance for low lamp intensity at low frame rates, aged neon lamps requiring large dynamic breakdown voltages, and short duration timed pulses at high pulse repetition rates, which are required at high frame rates. Fast frame rates, such as 10,000 pictures/second, require fast timing mark pulse repetition rates, typical 1,000 to 10,000 pulses per second. At 10 kHz. pulse repetition rates, the pulse duration time must be restricted to 10 microseconds or less. It may be shown that the present-day conventional timing lamp systems do not posses this capability. The prior art technique seeks the direct transmission of a high voltage pulse for rapid turn on of the neon lamp for film marking. It may be shown that:

(1) The voltage pulse appearing across the lamp does not possess the rise time characteristics of the original pulse prior to transmission but rather exhibits a delayed rise similar to that found across a capacitance charged through a series resistance in response to a step change in voltage.

(2) This condition results when pulse transmission is attempted through a line terminated by resistance much larger than the line characteristic impedance (i.e., multiple line reflections occur).

(3) The excess capacitance of the line (proportional to line length) and the impedance of the pulse source (to include the lamp current limiting ballast resistance $R_B$) together represent a time constant that predict the rate of rise in voltage across the lamp.

(4) A de-ionized neon lamp requires a much higher voltage for fast turn on than required by the lamp once ionized.

(5) The combined effects of 3 and 4 produce a *delayed ionization* of the lamp relative to the original pulse and that this delay may range into the hundreds of microseconds or in the extreme case cause timing lamp "dropout."

(6) The same mechanisms (3 and 4) contribute to (a) an undesired large amplitude current spike through the lamp upon ionization, and (b) a delayed fall in lamp voltage and current with attendant timing mark tail upon original pulse termination.

SUMMARY

The present invention utilizes a neon timing light source in conjunction with a timing signal generator to provide a reference time scale to high speed film. Timing pulses from the timing signal generator are applied to the neon timing light source through a neon lamp pre-ionization unit and a properly matched line receiver-line driver. This system effectively eliminates the neon lamp ionization delay problems which are associated with the prior art systems. The present neon timing system is operable in systems which employ thousands of feet of transmission line and is capable of producing predictable and repeatable timing marks in the presence of system dissimilarities and lamp ageing characteristics. An improvement of two orders of magnitude may be achieved in the current pulse trailing edge fall time and the spike at the leading edge is eliminated. The neon timing light source provides precise current amplitude control and pulse repetition rates in excess of 100 kHz. with minimum pulse widths of one microsecond.

It is one object of the invention, therefore, to provide an improved high speed film marking apparatus to eliminate the timing lamp ionization delay problem which is inherent in conventional timing systems.

It is another object of the invention to provide an improved high speed film marking apparatus having precise current amplitude control in the range of 1 milliamp to 50 milliamps.

It is yet another object of the invention to provide an improved high speed film marking apparatus having fast rise and fall time pulses less than 0.2 microsecond.

It is still another object of the invention to provide an improved film marking apparatus having high pulse repetition rates in excess of 100 kHz. and minimum pulse widths of the order of 1 microsecond.

It is a further object of the invention to provide an improved film marking apparatus which produces predictable and repeatable timing marks in the presence of system dissimilarities, lamp ageing characteristics and long transmission lines.

It is a still further object of the invention to provide an improved film marking apparatus utilizing one party line transmission line for multiple camera timing light operation.

DESCRIPTION OF DRAWINGS

FIG. 1a is an equivalent circuit of the lamp driver unit shown in FIG. 1;

FIG. 4 is a block diagram of the high speed film marking apparatus utilizing a balanced transmission line to conduct the pulse signal.

DESCRIPTION OF PREFERRED EMBODIMENT

Figure 1:
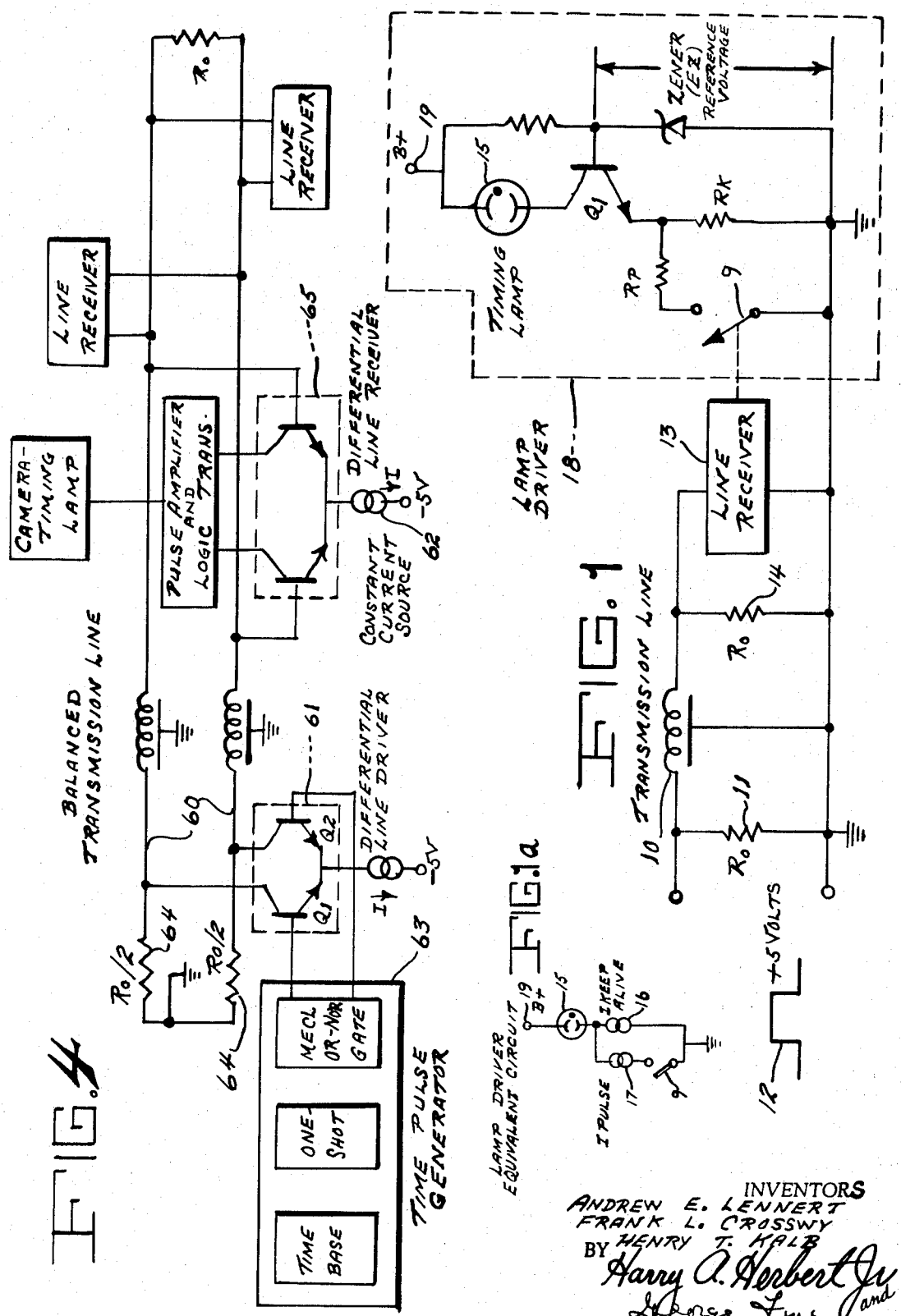
FIG. 1 is a schematic diagram of the high speed film marking apparatus in accordance with this invention.

Referring now to FIG. 1, there is shown a timing light film marking apparatus utilizing a transmission line 10 which is terminated by resistor 11 to receive a low voltage timed pulse 12. The resistor 11 has a value equal to the characteristic impedance of the transmission line 10. The leading edge of the pulse 12 travels the line at a rate of 1.6 nanoseconds/ft. appears at the line receiver 13 where the pulse is "absorbed" across resistor 14. The line receiver 13 responds to the pulse 12 by closing switch 9 which is shown as a component in the lamp driver unit 18. The equivalent circuit of lamp driver 18 is shown in FIG. 1a. The neon timing lamp 15 is kept in a pre-ionized keep-alive state by current source 16 which maintains a low-level (less than 100 microamps) keep-alive current through the lamp. This technique avoids the much larger dynamic breakdown voltages which are required to start a de-ionized lamp. Upon switch 9 closure, a second current source 17 supplies the pulse amplitude current to the lamp 15.

The current source 16 utilizing transistor Q1, resistor $R_k$ and Zener diode $E_z$ (these components are shown in FIG. 1) serves as a precision keep alive current source. The B+ voltage is applied at terminal 19. The transistor Q1 will permit the necessary current through $R_k$ to establish a voltage drop across $R_k$ equal to the Zener reference voltage. The current that the lamp 15 is permitted to receive is $$I_{keep\ alive} = \frac{E_z}{R_k}$$

When the switch 9 is closed, the resistor, $R_p$ is placed in parallel with resistor $R_k$. The pulsed lamp current 17 then becomes $$I_{pulse} = E_z \frac{(R_k + R_p)}{R_k R_p} = \frac{E_z}{R_p}, \text{ where } R_k \gg R_p$$

Tests with the lamp driver 18 reveal pulse rise and fall times of less than .25 microsecond for pulse amplitudes from 1 to 50 milliamps. Amplitude control to better than 1 percent has been easily obtained.

Figure 2:
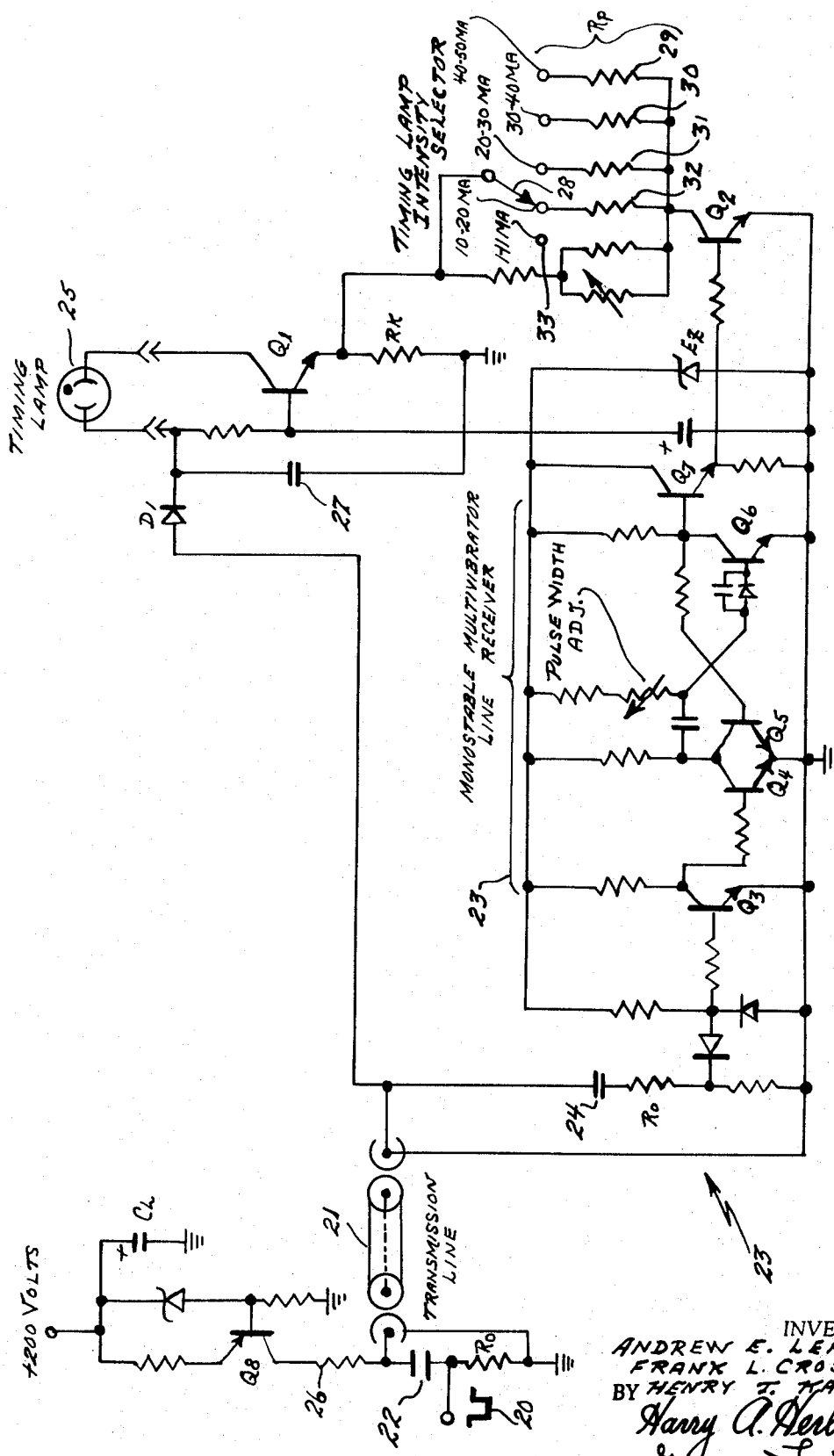
FIG. 2 is a schematic diagram which illustrates an embodiment of the invention utilized for high pulse repetition rate film marking.

The basic circuit which is shown in FIG. 1 requires, however, a nominal +200 volt source at the camera site. In many camera installations this requirement may not be possible. The circuit which is shown in FIG. 2 incorporates all the desirable features outlined in FIG. 1 and, additionally, utilizes one transmission line to convey the 200 volt DC source concurrently with the timed pulse to the line receiver 13 (FIG. 1). A negative trigger pulse 20 is AC coupled into the line 21 by capacitor 22 and coupled from the line 21 to the receiver, a monostable multivibrator 23 by capacitor 24. The multivibrator 23 which consists of transistors Q3, 4, 5, 6, 7 functions to produce a times width driving pulse to transistor $Q_2$. $Q_2$ acts as switch 9, FIG. 1. Thus, the pulse current source is coupled to the timing lamp 25 during the quasi-stable state (time out period) of the multivibrator 23.

Transistor $Q_8$ serves as a current limiting device in the event of a shorted transmission line 21. During normal system operation, transistor $Q_8$ remains saturated. Resistor 26 serves to direct the trigger pulse 20 down the line 21 rather than through capacitor $C_L$. In addition, diode $D_1$ directs the trigger pulse 20 through capacitor 24 rather than through 27. Capacitor 27 serves as an energy source for the lamp driver during the current pulse period. The timing lamp intensity is selected by placing switch 28 in series with resistors 29–32 or in position 33.

Figure 3:
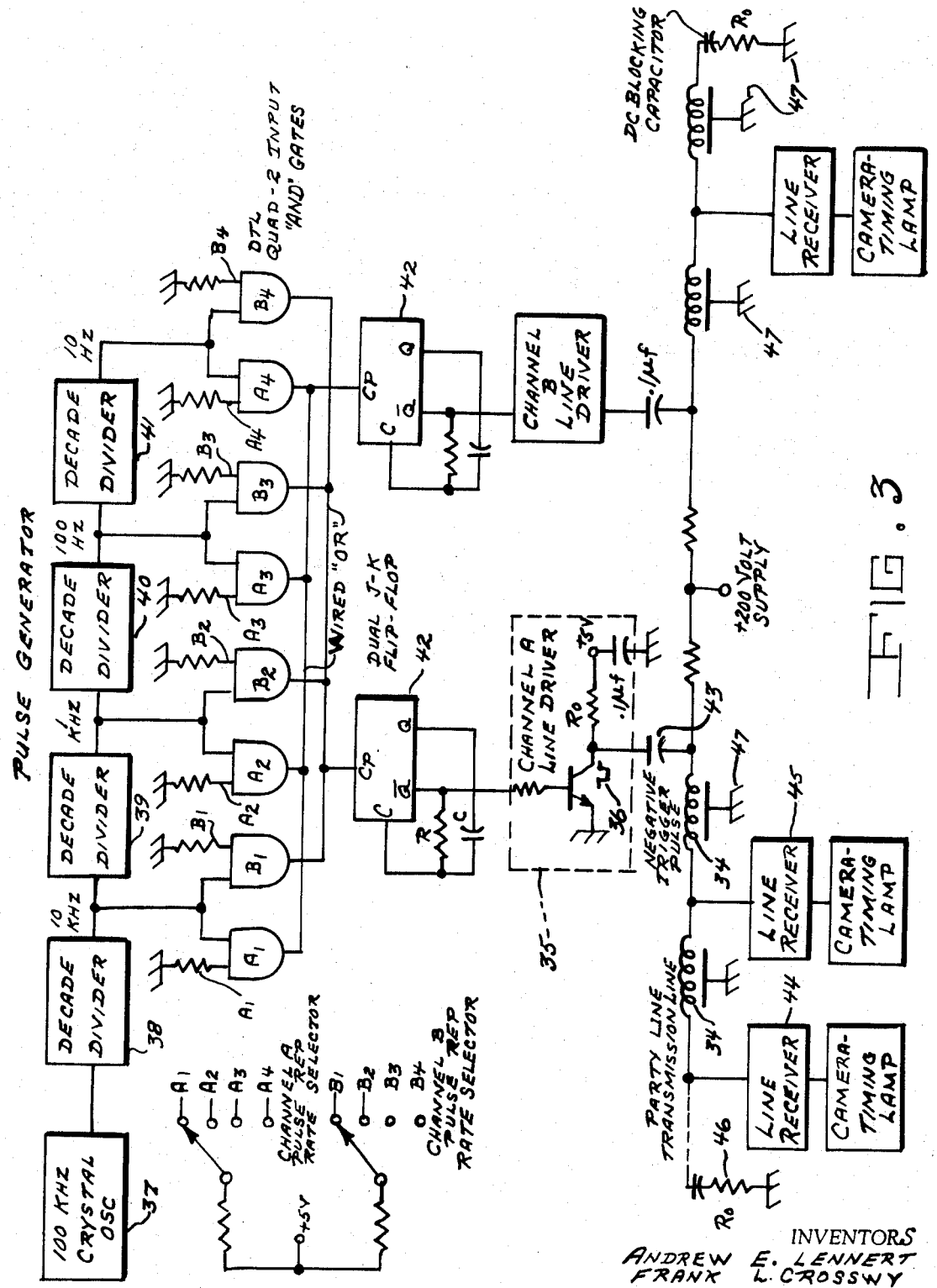
FIG. 3 is a block diagram of the high speed film marking apparatus being utilized in a multiple camera system.

FIG. 3 illustrates the lamp driver circuit being utilized in a multiple camera installation. It is commonplace to employ multiple cameras per test, running at the same frame rate, to adequately cover the test event in progress. Event transition time need be resolved into the millisecond or submillisecond region with a common timing source (timing pulse generator) serving all cameras. The common time source permits the cross-correlation of the timing marks on all film strips. In the actual installation the generator is housed within a control room remote from the test cell with cables (typically 100 to 600 ft. in length) radiating from generator to cameras. In the conventional system each camera timing lamp must be served by a separate cable. This requirement stems from the inability to ionize neon lamps in parallel when served by a common ballast resistance $R_b$. FIG. 3 demonstrates how a dozen cameras may be operated employing one transmission line as a party line to convey the common timed pulse train (a single pulse rep rate must be used) and the neon lamp high voltage source to multiple cameras. It is noted that each end of the party transmission line is terminated in a resistance equal to the line characteristic impedance $R_o$ to prevent line reflections. This approach offers considerable savings in cable and installation costs over conventional systems.

A simple pulse generator having a suitable line driver 35 for delivering the required negative trigger pulse 36 to the transmission line 34 is shown. The pulse generator employs diode-transistor-logic (DTL) integrated circuit (IC), dual-in-line (DIP) packages as commonly used in computer circuitry. The IC package applied to printed circuit board offers a considerable savings in pulse generator construction over the use of discrete components. A brief description of the pulse generator follows. A 100 kHz. crystal controlled oscillator 37 supplies a pulse train to four decade dividers 38, 39, 40, 41. Each divider produces a pulse train output which is one-tenth the pulse rep rate entering. The divider, a single DIP package, contains four flip-flops with internal gating to accomplish the divide by 10 process. Four pulse trains at the exit of the four dividers is thus available for camera timing lamp pulse rep rate control. These rates are 10 kHz., 1 kHz., 100 Hz. and 10 Hz. inclusive. The selection of the desired pulse train is achieved by the two quad-2 input AND gates (A1–A4 and B1–B4) and the pulse rep rate selector switches labeled channel A and channel B with a matching numerical designation of the respective AND gate. The output of the gates appears on a wired "OR" common bus (only one gate at a time is permitted open). The selected pulse train is directed to a J-K flip-flop 42 (one per channel). The flip-flop 42 is connected to function as a monostable multivibrator producing a controlled width pulse output (nominally 0.5 microsecond) each time a positive going waveform appears at the flip-flop $C_p$ input. The monostable pulse then gates the line driver 35 transistor on causing a negative going 5 volt, 0.5 microsecond pulse to appear at the line driver 35 transistor collector. This "trigger" pulse is then coupled into the transmission line 34 through capacitance 43 and propagates down the line 34 triggering the coupled line receivers (typically shown as 44, 45) with its passage. The trigger pulse, upon reaching the end of the line 34, is absorbed (no reflections) by resistor 46 whose value is the line characteristic impedance $R_o$.

This multiple camera timing system has been experimentally proven to be capable of driving 12 cameras at pulse rep rates in excess of 50 kHz. A major consideration, however, in circuit performance is the electrical environment within which the system is installed. The system as described employs a single ended drive and receive coax transmission line. It is of paramount importance that very special consideration be given to the transmission line installation ground returns if ground loops with accompanying external noise currents are to be excluded from timing signal circuits. With reference to FIG. 3, the system ground nodes 47 shown (also other ground points created in system installations at equipment racks, test cell bulkheads, etc.) must be isolated from building ground (or earth ground) except at one point only, at the line driver.

Successful low level fast rise time pulse transmission over long distances in the presence of (1) strong magnetic fields, (2) capacitance coupled cross talks from adjacent signal or power cables, (3) common mode or ground loop noise sources between far removed "ground" points requires the application of special cable techniques.

Coax cable having an additional outer braid shield for connecting the line driver and multiple line receivers must be utilized. The outer shield is earth ground or building ground and bypasses both ground loop and capacitance field noise currents away from the signal carrying coax, greatly improving the signal-to-noise ratio over standard coax cable usage. The inner shield serves as signal or system ground and is electrically insulated from the outer shield.

Induced noise from strong magnetic fields (where the cable acts as a "secondary winding" of a transformer) is particularly difficult to reject. Likewise common-mode noise from remote strong radiating noise sources (arc-welders commutation of DC motors, arc lamps) conveyed in by power lines and power grounds are difficult to reject. In the more severe electrical environment of the test cell a combined use of two conductor twisted balanced line with grounded braid shield and a balanced transmission line 60 (see FIG. 4) may be required for successful pulse signal transmission. The balanced line 60 employs a differential driver 61 where transistors Q1 and Q2 act as current switches to divert a constant current source 62 from one side of the line to the other in response to the driving pulse from the timing pulse generator 63. The switched current source produces a voltage change across the two resistors $R_0/2$ 64. This constitutes a differential input line driving voltage pulse. The twisted pair transmission line 60 sees an input termination of $R_0$ comprised of the two $R_0/2$ resistors 64, thus line reflections are avoided. The far end of the line is also terminated by a resistance equal to the line characteristic impedance. A special form of differential input line receiver 65 is employed to receive the transmitted pulse. Thus, common-mode noise signals on the two wire line 60 (signals in time phase and equal amplitude) cannot be "seen" by the differential line receiver. This type receiver represents negligible loading to the line (large input impedance) and may be placed at multiple points along the party line. Special interconnects that do not degrade the uniformity of the line may be employed at the tap to prevent a line reflection. The differential line receiver 65 is available in integrated circuit form (typical Fairchlid 9620 receiver and Texas Instruments SN75107) and may be interfaced directly with the lamp driver 18 shown in FIG. 1. The balanced line technique may easily drive a 1000 ft. line in the presence of a 100 to 1 common mode noise to signal ratio. Driver-receiver line repeaters may be employed to extend the pulse transmittal distance to several miles.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may be used to advantage without a corresponding use of other features.

We claim:

1. A film marking apparatus for application of a reference time scale to high speed film comprising in combination:
   a transmission line having a pair of input and output terminals, said input terminals receiving a low voltage timed pulse input signal, said input signal being applied to said output terminals, said transmission line being terminated at each end by a resistance equal to the line characteristic impedance to prevent line reflections;
   a line receiver connected to said output terminals to receive said input signal, said line receiver being responsive to said input signal and providing a control signal; and
   a lamp driver connected to said line receiver to receive said control signal, said control signal pulsing said lamp driver to provide timed light pulses;
   a pulse generator connected to said transmission line input terminals to supply said timed pulse input signal.

2. A film marking apparatus as described in claim 1 wherein said lamp driver comprises:
   a B+ voltage source;
   a neon timing lamp having a first and second electrical contact, said first electrical contact being connected to said B+ voltage source;
   a pulsed current source having an input and an output terminal, said output terminal being connected to said second electrical contact;
   a means for switching said pulsed current source connected between said input terminal and ground, said switching means being responsive to said control signal from said line receiver; and
   a keep alive current source connected in parallel with said pulsed current source and said switching means, said keep alive current source being connected between said second electrical terminal and ground, said neon timing lamp being maintained in a pre-ionized state by said keep alive current source.

3. A film marking apparatus as described in claim 1 wherein said line receiver comprises a monostable multivibrator.

4. A film marking apparatus as described in claim 1 wherein said pulse generator comprises a crystal controlled clock, four decade dividers, two quad-2 input and gates, channel A-channel B selector switches, a dual J-K flip-flop and two line driving transistors.

References Cited

UNITED STATES PATENTS 3,449,046  10/1969  White _____ 352—92 X
3,449,758  10/1969  Lavine _____ 352—84 X SAMUEL S. MATTHEWS, Primary Examiner M. L. GELLNER, Assistant Examiner U.S. Cl. X.R.

352—92